No. 873,674. PATENTED DEC. 10, 1907.
H. E. MILLER.
ELECTRICAL TESTING SYSTEM.
APPLICATION FILED APR. 16, 1906.
2 SHEETS—SHEET 1.
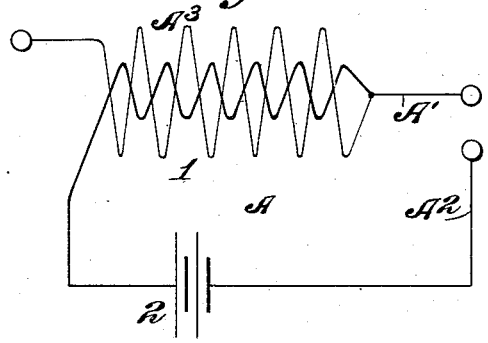
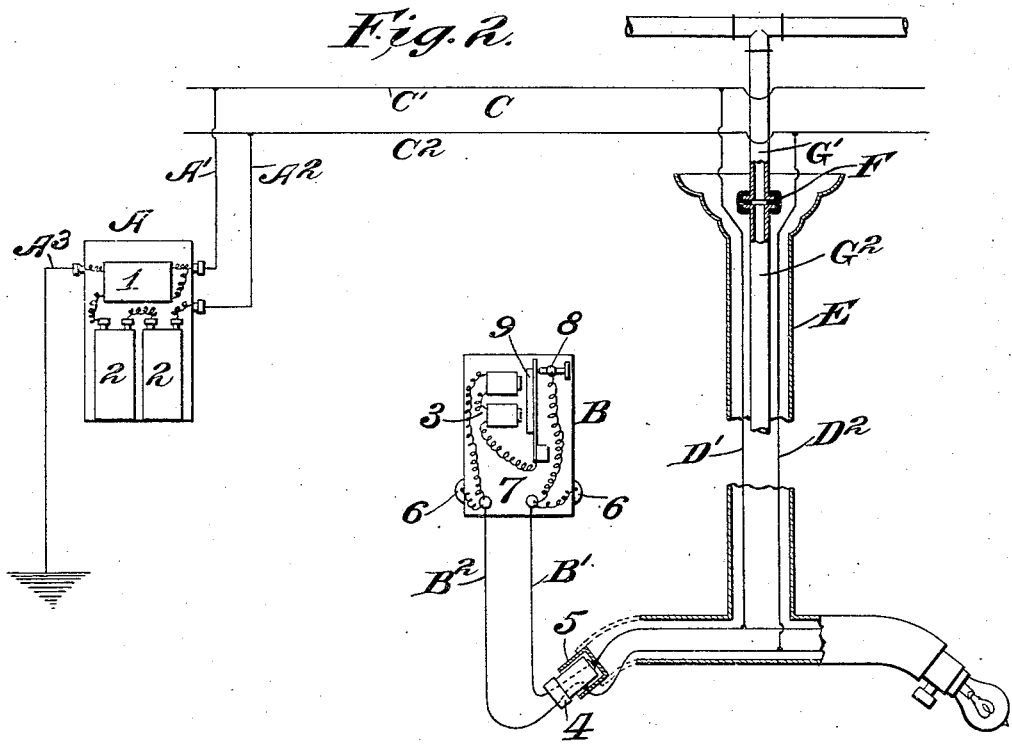

No. 873,674. PATENTED DEC. 10, 1907.
H. E. MILLER.
ELECTRICAL TESTING SYSTEM.
APPLICATION FILED APR. 16, 1906.

2 SHEETS—SHEET 2.

Witnesses:
G. A. Pennington
J. B. McGowan

Inventor:
Howard E. Miller,
By Cant+Cann,
Attys.

UNITED STATES PATENT OFFICE.

HOWARD E. MILLER, OF ST. LOUIS, MISSOURI.

ELECTRICAL TESTING SYSTEM.

No. 873,674.

Specification of Letters Patent.

Patented Dec. 10, 1907.

Application filed April 16, 1906. Serial No. 311,952.

*To all whom it may concern:*

Be it known that I, HOWARD E. MILLER, a citizen of the United States, and a resident of the city of St. Louis and State of Missouri, have invented a new and useful Improvement in Electrical Testing Systems, of which the following is a specification.

My invention relates to electrical testing systems, and it has for its principal objects to enable a single operator to make all the usual tests of electrical wiring systems without assistance, to avoid conditions incidental to previous testing systems which are liable to affect the accuracy of the tests; and to attain other objects hereinafter more fully appearing.

My invention consists in the parts and in the arrangements and combinations of parts hereinafter described and claimed.

Figure 3:
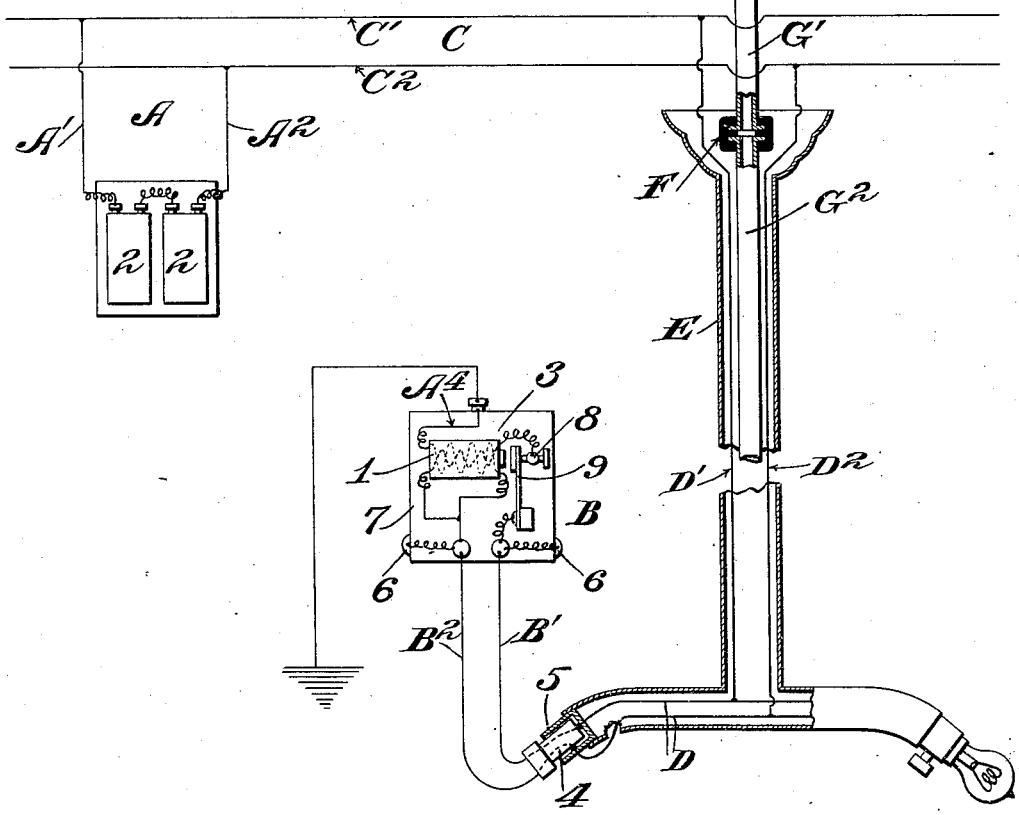
Figure 4:
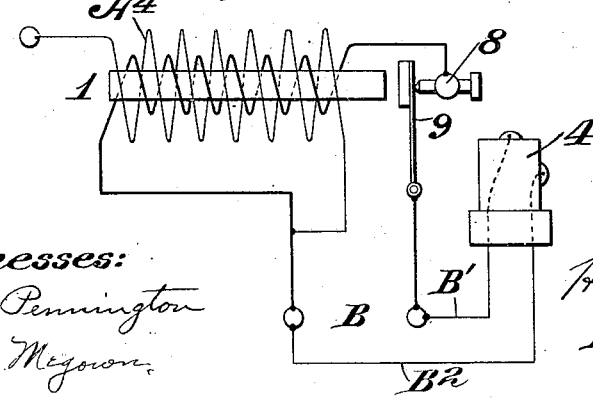

In the accompanying drawing, which forms part of this specification, and wherein like symbols refer to like parts wherever they occur, Figure 1 is a diagrammatic view of a testing loop or loop circuit comprising an induction coil and a battery; Fig. 2 is a diagrammatic view of the testing apparatus applied to a system of electrical wiring. Fig. 3 is a diagrammatic view of a modification of the testing apparatus applied to a system of electric wiring; and, Fig. 4 is a diagrammatic view of a modified form of indicator test loop.

The electrical testing system comprises two test loops or loop circuits, A and B, adapted for connection to the wiring system C which is to be tested. One of said test loops A contains an induction coil 1 and a battery 2 or other suitable source of electrical energy. The other loop B contains an electrical indicator 3 which is preferably an electro-magnetic vibrator that serves as a circuit breaker or interrupter for the induction coil.

The battery test loop is connected across the main lines of the house wiring system close to the point where they enter the building, and it remains thus connected to the main wires throughout the tests. The indicator test loop terminates in a plug 4 adapted to fit into the ordinary incandescent lamp socket 5 and such plug is provided with contact plates constituting terminals of the indicator test loop, which contact plates are arranged to contact with the terminals of the lamp circuit D in the socket.

The indicator test loop is provided with two contact plates 6, 6, arranged respectively, on opposite sides of the indicator. For convenience of manipulation, the contact plates are preferably made in the form of knobs mounted upon a small plate or piece 7 of insulating material which also serves as the mounting for the indicator.

House-wiring systems are commonly tested to determine: 1st, whether the circuits are complete; 2nd, whether they are properly insulated; and, 3rd, whether the gas pipe system is properly insulated from the fixtures. In making all of these tests, as stated above, the battery test loop is electrically connected to the line wires and the indicator test loop is inserted in a lamp socket. If the system is in proper condition, the circuit is completed from the battery 2 through one wire A' of the battery loop circuit to one of the main house wires C', thence through one wire D' of the lamp circuit to a contact plate of the lamp socket 5, thence through the contact plate of the plug 4 of the indicator loop and through one wire B' of said loop to the back stop 8 of the armature 9 and thence through the armature of the interrupter, thence through said armature and the electromagnets of said interrupter 3 and thence through the second wire $B^2$ of the indicator of the loop circuit to the second contact plate of the plug 4, and thence through the contact plate of the lamp socket in contact therewith and the return wire $D^2$ of the lamp circuit and thence through the return house wire $C^2$ to the second wire $A^2$ of the battery loop and thence through said loop back to the battery. In consequence of the completion of the circuit through the battery and the indicator, the condition is shown by the indicator. For instance, if the indicator is a buzzer or indicator (as shown in the drawing), the completion of the circuit will cause it to produce its characteristic sound.

To determine whether the system is properly insulated from the fixtures, the knobs 6, 6 on the opposite sides of the indicator are successively brought into contact with the fixtures E while the indicator circuit plug is still in the lamp socket. In case of defective insulation, a short circuit around the indicator is formed from one to the other of the contact knobs 6 to the wire that is in contact with the fixture. In consequence of this short circuit, there is a decrease of electrical energy operating on the indicator, and the indicator responds thereto. In case the indicator is a buzzer, as above mentioned, the short circuit is indicated by a change or cessation of its sound.

An insulating joint F is interposed between the portion G' of the gas pipe system that is directly connected to the gas main in the ground and the section G² which constitutes or is inclosed in the fixture E of the house. Usually this joint is located directly above the fixture near the ceiling and its purpose is to insulate the fixture from the ground. In order to determine whether the joint F interposes a sufficient resistance to properly insulate the fixture, the secondary winding A³ of the induction coil is electrically connected to the ground in any suitable manner, while the plug 4 of the indicator loop is in the lamp socket 5 of the fixture. The grounding of the secondary winding has the effect of establishing an electrical connection of each of the contact pieces 6 to the ground; so that the touching of either of said contact pieces against the fixture will complete the circuit of the secondary winding of the induction coil to the ground through the gas pipes, if the fixture is not sufficiently insulated, whereas the circuit of the secondary winding of the induction coil will remain open at the joint F if said joint interposes sufficient resistance. Assuming that the joint F does not interpose sufficient resistance to a current of high electro-motive force induced in the secondary coil, the circuit of the secondary coil is completed as follows: from ground through the secondary winding A³ of the induction coil and thence by wire A' of the battery loop circuit to one of the main house wires C', and thence through one of the wires D' of the lamp circuit, and thence through the wire B' of the indicator loop to the contact piece 6, and thence to the fixture E and thence to the section G² of the gas pipe inclosed within and in contact with said fixture, and thence across the defective or insufficient insulation F to the grounded portion G' of the gas pipe system. As there is a circuit interrupter (that is, the buzzer) in the primary circuit of the induction coil, and as the circuit of the secondary winding is completed to ground at both ends, a current of high electro-motive force is induced in said secondary circuit. This current in the secondary coil has the effect of producing self-induction in the primary coil, and this self-induction brings about a change in the current of the primary coil. As stated above, the buzzer normally produces a characteristic sound, which is due to the regular opening and closing of the circuit to the battery current. When this current is affected by the self-induction arising from the closing of the circuit through the secondary winding of the induction coil, such change of current is indicated by a change of sound in the buzzer or otherwise appropriately indicated by the indicating instrument.

It will be noted that in this system, all tests are made with a battery or other source of energy that remains substantially constant throughout the tests. It is also noted that all tests for a given lamp socket may be made without removing the plug of the indicator circuit therefrom.

Divers changes may be made in the arrangement of the parts without departing from my invention. For instance, as illustrated in Figs. 3 and 4 the induction coil may be eliminated from the battery loop, and the coil of the buzzer in the indicator loop may be provided with a normally open secondary winding A⁴, whereby the interrupter becomes in effect an induction coil. The particular advantage of this arrangement is that the secondary winding A⁴ may be grounded at the point where the test is being made instead of at the more or less distant terminals of the house wiring system.

Obviously, my system admits of divers modifications within the scope of my invention, and therefore I do not wish to be limited to the specific construction shown and described.

What I claim as my invention and desire to secure by Letters Patent is:

1. An electrical testing system comprising an induction coil whose primary terminals and one of whose secondary terminals are connected to the circuit to be tested and whose other secondary terminal is grounded, and an electro-magnetic circuit breaker whose armature is in circuit with the circuit to be tested.

2. An apparatus for testing electrical circuits comprising an induction coil whose primary terminals are adapted for connection to said circuit, and whose secondary coil is electrically connected to the ground and to said circuit, respectively, a battery in circuit with the primary winding of said coil, and an electro-magnetic vibrating circuit breaker whose terminals are adapted for electrical connection with said first mentioned circuit.

3. A system of testing incandescent lamp circuits comprising a normally open lamp circuit having a lamp socket therein, a test loop containing an electrical indicator and a contact plug adapted to fit into said socket and containing the terminals of said test loop in position to contact with the terminals of the lamp circuit in said socket, said test loop also having a contact surface adapted for contact with a fixture and a second loop comprising a battery and an induction coil, the primary winding of which is adapted for connection to the lamp circuit, and the secondary winding of which is connected at one end to the primary circuit and at the other end to the ground.

4. A system of testing incandescent lamp circuits comprising a normally open lamp circuit having a lamp socket therein, a test loop containing an electrical indicator and a contact plug adapted to fit into said socket and containing the terminals of said test loop in position to contact with the terminals of the lamp circuit in said socket, said test loop also having a contact surface adapted for contact with a fixture and a second loop comprising a source of electrical energy and an induction coil, the primary winding of which is adapted for connection to the lamp circuit, and the secondary winding of which is connected at one end to the primary circuit and at the other end to the ground.

5. A system of testing incandescent lamp circuits comprising a normally open lamp circuit having a lamp socket therein, a test loop containing an electrical indicator mounted on a block and a contact plug adapted to fit into said socket and containing the terminals of said test loop in position to contact with the terminals of the lamp circuit in said socket, and a second loop containing a source of electrical energy and adapted for connection to the lamp circuit, said test loop also having contact pieces mounted on said block in each side of said indicator.

6. An apparatus for testing insulating joints adapted to insulate fixtures from the ground comprising an induction coil whose primary terminals and one of whose secondary terminals are connected in circuit, and whose other secondary terminal is grounded, a battery in said circuit, an electro-magnetic circuit breaker whose armature is in said circuit, and a contact piece electrically connected to said circuit and in position to contact with said fixture.

Signed at St. Louis, Missouri, this 13th day of April, 1906.

HOWARD E. MILLER.

Witnesses:
WM. M. CADY,
J. B. MEGOWN.